United States Patent [19]

Crooks

[11] Patent Number: 4,526,580
[45] Date of Patent: Jul. 2, 1985

[54] METHOD OF PREPARING COLLAGEN EXTRUSION GELS

[75] Inventor: Hubert B. Crooks, High Bridge, N.J.

[73] Assignee: Devro, Inc., Somerville, N.J.

[21] Appl. No.: 531,137

[22] Filed: Sep. 12, 1983

[51] Int. Cl.³ ............................................... C14C 1/00
[52] U.S. Cl. ..................................... 8/94.18; 8/94.15; 426/277; 426/652
[58] Field of Search ............................... 8/94.15, 94.18

[56] References Cited

U.S. PATENT DOCUMENTS

| | | | |
|---|---|---|---|
| 2,928,822 | 3/1960 | Johnsen et al. | 426/656 |
| 3,073,702 | 1/1963 | Keil et al. | 426/278 |
| 3,123,482 | 3/1964 | Lieberman | 426/140 |
| 3,308,113 | 3/1967 | Johnsen et al. | 426/271 |
| 3,408,917 | 11/1968 | Cohly | 426/277 |
| 3,512,997 | 5/1970 | Cohly et al. | 426/277 |
| 3,535,125 | 10/1970 | Fagan | 426/277 |
| 3,567,467 | 3/1971 | Cohly | 426/277 |

Primary Examiner—A. Lionel Clingman
Attorney, Agent, or Firm—Michael O. Tatlow

[57] ABSTRACT

A process of preparing a collagen gel to be extruded into a collagen sausage casing of improved clarity or translucency is disclosed. The process comprises the treatment of buffered hide corium with a solution containing 2% to 5% glycerine, 0.5% to 3% hydrogen peroxide and from 25 to 70 parts per million of ferrous ion.

7 Claims, No Drawings

METHOD OF PREPARING COLLAGEN EXTRUSION GELS

The present invention relates to an improved process for the preparation of collagen materials which will be used to extrude tubular collagen sausage casings and like materials.

BACKGROUND OF THE INVENTION

Reconstituted collagen is widely used in the manufacture of tubular sausage casings. These sausage casings are edible and relatively easy to masticate or chew. A highly desirable characteristic of such casing is the translucency of the casing which allows the meat color to be perceived through the casing. Reconstituted collagen casings have a tendency to absorb water from the meat emulsion. This absorbed water hydrates the casing, and the casing becomes opaque, thereby blocking the transmission of meat colors through the casing. In order to prevent the hydration of the casing, some processes use extensive chemical crosslinking agents which make the collagen less hydratable. Although such chemically crosslinked casing has improved translucency properties, the extensive crosslinking of the collagen makes the casing less tender and difficult to chew and, therefore, less desirable as a sausage casing.

The prior art processes provide casings which have good translucency but which are difficult to chew and casings which are tender and relatively easy to chew but which have poor translucency properties.

The present invention provides a process which significantly improves the translucency of the casing without leading to excessive toughness of the casing. The present process employs materials which have long been used in the manufacture of reconstituted collagen casings and, thus, offer a minimum number of problems in connection with toxicity, and these materials have all been approved for use in the food processing of various foodstuffs.

In conventional sausage casing processes, the raw collagen used in the manufacture of the casing is derived from corium layer of a cowhide. The hides are usually processed to dehair the hide and to deflesh the hide and then chemically treated to remove non-collagen protein and other materials from the hide. The hide is then split to remove the epidermis. All these processing steps are usually carried out on standard tannery equipment. The hide is then usually cut into small sections, from ½ to 4 square inches, and reduced to a pulp by passing it through grinders. The finely ground hide is then usually swollen with acid and blended with other ingredients in a suitable homogenizer to make an extrudable gel. In the present process, the corium layer of the hides is treated prior to the hide being cut into pieces. The treated hide corium can be refrigerated and held until needed.

The process of the present invention includes the treatment of the hide corium with a solution containing hydrogen peroxide, glycerine and a ferrous salt. This treatment results in a casing which has a significantly improved clarity over a casing prepared from the same hides that have not been subjected to the treatment of the present process.

Hydrogen peroxide has been previously employed in the treatment of collagen for use in food, cosmetic and pharmaceutical applications. The hydrogen peroxide has been used as a bleaching agent and to remove objectionable odor and flavor properties in the collagen material. Examples of the use of hydrogen peroxide for this purpose can be found in U.S. Pat. Nos. 2,928,822 and 3,308,113. Hydrogen peroxide has also been employed as an agent to modify the collagen to make it more readily dispersible in water. An example of this process can be found in U.S. Pat. No. 3,073,702. In addition to the above, there are a number of collagen preparation processes which employ an enzyme to break down the non-collagen proteinaceous materials in the hide. In these processes, hydrogen peroxide is often used to limit the effect of the enzyme.

The hydrogen peroxide is present in the solution used in the process of this invention in an amount of from 0.5% to 3% by weight of the aqueous solution. Less than 0.5% of hydrogen peroxide in the solution does not provide the desired results in a reasonable time period. More than 3% hydrogen peroxide in the solution does not offer any advantage in the process.

Glycerine is commonly used in the manufacture of collagen casing as an plasticizer. Generally, the extruded tubular casing is passed through a bath containing glycerine before the casing is dried. U.S. Pat. Nos. 3,408,917; 3,535,125; 3,512,997 and 3,567,467 disclose the use of glycerine as a plasticizer in the manufacture of collagen casing. In the present process, the glycerine is added to the corium hide layer at a much earlier stage in this manufacturing process, and at this point in the process it does not function as a plasticizer.

The third ingredient in the solution used in the present process, a ferrous salt, has been used in collagen processes as an ingredient in a tanning solution. The tanning of the casing occurs after the casing has been extruded. The function of the ferrous iron of the present process is not to tan the hide, as tanning the hide before the preparation of the gel would prevent the gel from forming a cohered, tubular casing. The ferrous ion is added to the solution in the form of ferrous chloride ($FeCl_2$—$4H_2O$) or ferrous sulfate ($FeSO_4$). The ferrous chloride is preferred because it is more soluble in the water. The ferrous ion is added in sufficient quantity to give a concentration of from 25 to 70 ppm. of ferrous ion in the treating solution with 45 ppm. being preferred. Concentrations higher than 70 ppm. have a tendency to discolor the casing.

Generally, the present process consists of treating the buffered corium layer of hide with a solution containing hydrogen peroxide, glycerine and a ferrous ion, preferably ferrous chloride, for from approximately 3 to 16 hours prior to the hide being comminuted and processed to form a gel. The solution which is used to treat the hide generally contains approximately 0.5% to 3% hydrogen peroxide, preferably 1% of hydrogen peroxide, from 2% to 5% glycerine, preferably 3% glycerine and 25 parts per million to 70 parts per million of iron from salts such as ferrous sulfate or ferrous chloride, preferably 45 ppm. The hide corium is treated with a solution for a minimum of about 3 hours while the hides are constantly being agitated in the solution. It is preferable to use a rotating treatment vessel to contact the hides with the solution, although other types of agitating systems may be employed. The preferred ratio of the peroxide to glycerine to ferrous chloride ingredients in the solution is 1:3:0.016. With this ratio of ingredients in the solution, the desired results can be achieved with a contact time of three hours. The weight ratio of the treating solution to the hide is from 1 to 2 parts of solution to 1 part of hide, 1-2:1.

The contact of the hides with the solution in the present process can be performed by adding the hides to the solution, adding the preformed solution to the hides or by adding the ingredients of the solution to a vessel containing the hides. If the ingredients are added to a vessel containing the hides, it is necessary to add the glycerine to the hides prior to the addition of the hydrogen peroxide. If the hydrogen peroxide is added to the hides first, it rapidly decomposes.

The mechanism by which the present process increases the clarity of the casing produced from the treated hides is not understood. As it is known that glycerine and hydrogen peroxide can react to produce glyceraldehyde, it was postulated that the clarity effect was due to chemical crosslinking of collagen by glyceraldehyde. However, the direct additon of glyceraldehyde to the hide at the same point in the process did not produce the casing clarity produced by the present process.

It should be understood that the clarity treatment process of the present invention can be employed with other processes, e.g., chemical crosslinking, to produce casings with even greater clarity or translucency.

The measurements of clarity or translucency are performed on a M-500-A Agtron Direct Reading Reflectance Spectrophotometer. This unit is manufactured by Magnuson, Inc. The Agtron Spectrophotometer consists of two light sources which are gaseous discharge tubes for illuminating the sample. There are interference filters for selecting one of four monochromatic lines from the sources. It has been determined that the present casings normally give the most meaningful results when tested on the Agtron with the blue color mode. In conducting the test, a M-300-A sample holder and light source is used in conjunction with the M-500-A primary unit. Casings made by the various examples in the present application are filled with warm water at a temperature from 70° F. to 80° F., and the ends of the casings are tied. The casing length is usually about 4″. The diameter of the water-filled casing is typically the same as when filled with a meat emulsion. A number of casings are set in the sample cup. Usually about 7 casings are sufficient to fill the cup. The Model M-300-A sample holder includes a mask which covers only the central region of the casings so that the entire mask is filled with casing material. The unit is calibrated before the tests are commenced. The calibration procedure includes the following steps:

1. The instrument is turned on with the color mode selector on the blue mode and allowed to warm up for approximately 30 minutes.

2. The sample cup is placed over the viewing area, and the calibration disc 00 is inserted into the unit.

3. The zero control is set for a meter reading of "zero".

4. The calibration disc 00 is replaced with calibration disc 44.

5. The standardized control is set to obtain a meter reading of "100".

The samples are then placed in the sample cup assuring that the entire viewing area exposed by the mask is completely filled with water containing sausage casing links. The calibration disc 00 is then placed over the water filled links in the sample cup and the instrument reading is obtained.

The process of the present invention results in a reduction in the Agtron reading of the casing of from 10 to about 20 units. The reduction in the Agtron reading is not constant because of the difference in the characteristics or quality of the hides that are employed. A reduction in the Agtron value of 10 is a significant improvement in the clarity or translucency of the finished casing.

In the following examples, the corium layers of the hide are prepared as set forth in Example I. Examples II–IV use as their starting material the buffered corium obtained by the steps of Example I.

EXAMPLE I

Hide Preparation

Hides from freshly slaughtered animals are weighed and batched into lots of 2700 kilograms. They are washed for three hours in continuously running water at a temperature of 20° C. to 21° C.

To a paddle vat of suitable capacity is added 6130 kilograms of water and the 2700 kilograms of washed hides.

Twenty-two kilograms of sodium carbonate are added to the vat and the paddle run for one and one-half hours.

Fifty-four kilograms of sodium sulfahydrate are then added and the paddle run for a further one hour, after which time, 8 kilograms of sodium sulfide are added. The paddle is run for 15 minutes before a further 54 kilograms of sodium sulfhydrate, plus 81 kilograms of hydrated lime are added. After this addition, the paddle is run for six and one-half hours.

At the end of this time, the vat is drained of chemical solution, and the hides are flood washed in 21° C. water for three hours. They are then removed for a first defleshing.

The fleshed hides are returned to the paddle vat, washed clean with well water at 15° C., then drained.

The paddle vat is recharged with 6130 kilograms of water and 22.5 kilograms of sodium bicarbonate, plus 81 kilograms of hydrated lime are added. The paddle is run for 12 to 18 hours.

The hides are removed from the vat and, after any needed trimming, are split on a leather slitting machine to separate the grain layer from the corium.

The corium layer is sided (split in half), given a second defleshing and placed in a drum for a final 30 minute wash with well water. A typical yield of corium is 700 kilograms.

Corium Buffering

The corium collagen layer, as produced in the above, must be buffered to pH 4.6 before being further treated with the clarity process. The buffering is done by the following exampled method:

A large fiberglass drum (capacity 2000 kg) is charged with 700 kilograms of corium collagen prepared as described above.

Eleven hundred and twenty kilograms of tempered (20° C.) water and 3.5 kilograms of ammonium sulfate are added, and the drum is rotated for 1 hour and 50 minutes.

The treatment solution is drained, the drum recharged with the same weights of water and ammonium sulfate, and the hide further treated for a second period of 1 hour and 50 minutes.

At the end of this time, the treatment solution is drained, and the corium is flood washed with tempered water for two and one-half hours using a flow rate of 120 liters of water/min.

After complete draining, the drum is charged with 1120 kilograms of tempered (20° C.) water to which is added 4.9 kilograms of citric acid and 6.6 kilograms of sodium citrate. The drum is rotated for 12 to 14 hours.

Periodic (2 hour) pH measurements are taken of the buffer solution. Citric acid additions are made as needed based on the results of these two hour tests to maintain the pH at 4.6.

At the end of the buffer treatment, the buffered corium is washed to remove residual citrate before being stored under refrigeration until the clarity treatment is performed.

EXAMPLE II

In this example, the preparation of hide to gain an increase in clarity of the finished casing is illustrated. Sections of hide weighing 6 to 8 kilograms are the starting point for the process.

A 500 kilogram composite of different lots of buffered hide prepared as in Example I at a temperature of 4° C. to 6° C. is loaded into an inclined mixer.

Twenty-four kilograms of glycerine are added to the mixer, and the mixer is rotated at 6 rpm for 5 minutes.

Seven hundred seventy kilograms of a solution containing 16.3 kilograms of 50% hydrogen peroxide, and at a temperature of 22° C. to 24° C. are pumped into the mixer while the mixer is rotating at 6 rpm.

One hundred twenty-eight grams of ferrous chloride are dispersed in 6 liters of water and added to the rotating mixer at a rate equivalent to 10 kilograms per minute. Treatment of the hide corium in this solution, which now contains 1% hydrogen peroxide, 3% glycerine and 45 ppm Fe, is continued for 3 hours. The drum or mixer is then emptied of liquid.

The treated hide corium is then washed in constantly changing water (preferably tempered) until the peroxide concentration in the wash water is less than 0.01%.

The hide corium is then drained of free water and put into refrigerated storage. It is held in this state until required for use for the preparation of an extrusion gel.

EXAMPLE III

The hide corium obtained by Example II is cut into ½ to 4 square inch sections and reduced to a pulp by passing these cut squares through a meat grinder. The samples are passed through the meat grinder three times with each successive pass being a finer grind. The first and second passes being through 18 and 8 millimeter holes, respectively, and the final grind is through holes 1.5 millimeters in diameter. During the grinding process, the pulp is kept at a temperature below 20° C. This temperature can be obtained by adding crushed ice to the hides as they are fed into the grinder or by using a refrigerated grinder.

The finely ground hide corium is swollen with hydrochloric acid or lactic acid and may be blended with cellulose fibers and glycerine, as described in Example VII in U.S. Pat. No. 3,123,482. This blending is done with a homogenizer. The homogenized mass so obtained is filtered and then extruded into a collagen casing. The extrusion of the casing and the subsequent processing of the casing is not part of the present invention. The extrusion and subsequent processing may be carried out by the process described in U.S. Pat. No. 3,535,125 with no curing agent or heat cure. The clarity of extruded casing tested on the Agtron Spectrophotometer had a value of 47.5.

EXAMPLE IV

In this example, the preparation of hide to gain an increase in clarity of the finished casing is illustrated. Sections of buffered hide weighing 6-8 kilograms are the starting point for this process.

A composite of buffered corium hide at a temperature of 4° C.-6° C. is loaded into an inclined mixer. Glycerine in an amount of 4.81% of the hide weight is added to the inclined mixer, and the mixer rotated at 6 rpm for 5 minutes.

Hydrogen peroxide solution at a concentration of 1.06% and a temperature of 22° C. is pumped into a mixer while this is rotating at 6 rpm. The weight of this $H_2O_2$ solution is 1.54 times the weight of hide being treated.

An amount of Fe salt calculated to equal 72 ppm Fe, based on hide corium weight is next dispersed in 20 kilograms of water at 22° C. This solution is added to the rotating inclined mixer at a rate of 10 kilograms per minute. The total solution will now contain 1% $H_2O_2$, 3% glycerin and 45 ppm Fe.

A representative analysis of the solution made 3 minutes after the end of the Fe salt addition is:
pH: 3.67
Temperature: 16.0° C.
$H_2O_2$: 0.88%

Treatment is continued for 3 hours. At the end of this time, a representative analysis of the solution would be:
pH: 4.37
Temperature: 17° C.
$H_2O_2$: 0.72%

The treatment solution is then drained completely. The drain valve is closed, and while the mixer is rotating, tempered (20° C.±20° C.) water is run into the inclined mixer until a volume equal to the initial hide plus solution volume is reached. At this time, the discharge valve is opened sufficiently so that the level may be maintained and at the same time a constant water through wash achieved. The aim in washing is to reduce the residual peroxide level of hide wash water to less than 0.01%. To determine the wash water $H_2O_2$ concentration accurately without the diluting effect of constantly changing water, the drum is rotated in a batch wash mode for 3 minutes prior to the time of solution sampling. After sampling, it is returned to a through wash cycle.

When a wash water $H_2O_2$ concentration level of less than 0.01% the discharge valve is fully opened. This hide corium is drained of free water and then put into 4° C.-6° C. storage. It may be maintained in this state until required for use.

A casing made using this hide had an Agtron clarity of 47.5.

EXAMPLE V

A series of experiments were performed varying the amount of hydrogen peroxide, glycerin and ferrous iron in the present process. The results of these experiments are reported in Table I.

TABLE I

| Run | Run Time (Hrs.) | $H_2O_2$ (%) | Glycerin (%) | Fe (ppm) | Agtron Reading |
|---|---|---|---|---|---|
| 1 | 3 | 1 | 3 | 67.5 | 35.5 |
| 2 | 3 | 3 | 3 | 45.0 | 39.0 |
| 3 | 3 | 1 | 6 | 45.0 | 52.5 |
| 4 | 3 | 3 | 6 | 67.5 | 40.5 |
| 5 | 16 | 1 | 3 | 45.0 | 47.0 |

TABLE I-continued

| Run | Run Time (Hrs.) | H₂O₂ (%) | Glycerin (%) | Fe (ppm) | Agtron Reading |
|---|---|---|---|---|---|
| 6 | 16 | 3 | 3 | 67.5 | 29.0 |
| 7 | 16 | 1 | 6 | 67.5 | 45.5 |
| 8 | 16 | 3 | 6 | 45.0 | 42.0 |
| 9 | 3 | 1 | 3 | 45.0 | 47.5 |
| 10 | 3 | 3 | 3 | 67.5 | 45.0 |
| 11 | 3 | 1 | 6 | 67.5 | 53.0 |
| 12 | 3 | 3 | 6 | 45.0 | 44.5 |
| 13 | 16 | 1 | 3 | 67.5 | 44.0 |
| 14 | 16 | 3 | 3 | 45.0 | 45.0 |
| 15 | 16 | 1 | 6 | 45.0 | 44.5 |
| 16 | 16 | 3 | 6 | 67.5 | 41.0 |
| 17 | 9.5 | 2 | 4.5 | 56.0 | 42.5 |

EXAMPLE VI

Buffered corium from the process of Example I was prepared into two samples. Sample A was treated for three hours with a solution containing 3% glycerin, 1% H₂O₂ and 45.0 ppm. of ferrous ion from ferrous chloride. The treated hide was then made into a casing by the process of Example III. Sample B of the same lot of buffered corium was also made into a casing by the same process. Sample B was not subjected to the clarity treatment of the present invention. The Agtron value of Sample A was 44.5, and the Agtron value of the untreated Sample B was 56.0.

EXAMPLE VII

The procedure of Example VI was repeated with three additional lots of hide corium. Casings made from untreated and treated hides were prepared as in Example VI, and the Agtron values of the casings were determined. The Agtron values were:

| Lot 1 | Untreated | 55.0 |
|---|---|---|
| | Treated | 36.0 |
| Lot 2 | Untreated | 59.0 |
| | Treated | 47.0 |
| Lot 3 | Untreated | 58.0 |
| | Treated | 48.0 |

I claim:

1. An improved process for the treatment of hide corium used in preparing a collagen gel to be extruded to form an edible collagen sausage casing with improved clarity comprising contacting buffered hide corium with an aqueous solution containing 2% to 5% by weight of glycerine, 0.5% to 3% by weight of hydrogen peroxide and from 25 to 70 parts per million of ferrous ion, mixing the solution with hide corium for a period from three to 16 hours, removing the hide from the solution, washing the hide with water to remove the residual reactants from the hide.

2. The process of claim 1 in which the ferrous ion is in the form of ferrous chloride.

3. The process of claim 1 in which the ratio of glycerine to hydrogen peroxide to ferrous chloride in said solution is 3:1:0.016.

4. The process of claim 3 in which the weight ratio of the solution to the hide corium is from 1 to 2 parts by weight of solution to 1 part by weight of hide corium.

5. The process of claim 4 in which the weight ratio of the solution to the hide corium is 1.6 to 1.

6. The process of claim 3 in which the hide is washed until the concentration of hydrogen peroxide in the water is less than 0.1%.

7. In a process for forming a collagen sausage casing in which hide corium is comminuted, ground and swollen with acid to form an extrudable collagen gel, the improvement comprising treating the hide corium, prior to comminution, with an aqueous solution containing 2% to 5% by weight of glycerine, 0.5% to 3% by weight of hydrogen peroixde and from 25 to 70 parts per million of ferrous ion, mixing the solution with the hide corium for a period of three to 16 hours, removing the hide from the solution, washing the hide with water to remove the residual reactants from the hide.

* * * * *

UNITED STATES PATENT AND TRADEMARK OFFICE
CERTIFICATE OF CORRECTION

PATENT NO. : 4,526,580

DATED : July 2, 1985

INVENTOR(S) : Hubert B. Crooks

It is certified that error appears in the above-identified patent and that said Letters Patent is hereby corrected as shown below:

Col. 8, line 20: "process of claim 1" should be -- process of claim 2 --.

Signed and Sealed this

Third Day of June 1986

[SEAL]

Attest:

DONALD J. QUIGG

Attesting Officer

Commissioner of Patents and Trademarks